United States Patent [19]

Shimizu et al.

[11] Patent Number: 4,588,453
[45] Date of Patent: May 13, 1986

[54] METHOD OF MANUFACTURING GRAIN-ORIENTED SILICON STEEL SHEETS

[75] Inventors: Yoh Shimizu; Teruyuki Nishide, both of Chiba, Japan

[73] Assignee: Kawasaki Steel Corporation, Kobe, Japan

[21] Appl. No.: 688,569

[22] Filed: Jan. 3, 1985

[30] Foreign Application Priority Data

Jan. 9, 1984 [JP] Japan .................................. 59-728

[51] Int. Cl.$^4$ .................................................. H01F 1/04
[52] U.S. Cl. ........................................ 148/111; 148/113
[58] Field of Search ................. 148/110, 111, 112, 113

[56] References Cited

U.S. PATENT DOCUMENTS 4,330,348  5/1982  Nagano ............................... 148/111

FOREIGN PATENT DOCUMENTS 2656161  6/1978  Fed. Rep. of Germany ...... 148/111

Primary Examiner—John P. Sheehan
Attorney, Agent, or Firm—Balogh, Osann, Kramer, Dvorak, Genova & Traub

[57] ABSTRACT

A method of manufacturing a grain-oriented silicon steel sheet having excellent magnetic properties. In this method, a silicon steel slab containing 2.0–4.5 wt % of Si, 0.02–0.10 wt % of Mn and 0.005–0.06 wt % in total of at least one of S, Se and Al is subjected to such a heat treatment prior to a hot rolling that the slab is heated to a slab center temperature of 900°–1,230° C. in a slab heating furnace of a gas firing type and placed in a slab induction heating furnace before the slab center temperature is less than 900° C. and then held at a slab center temperature of 1,250°–1,380° C. for not less than 10 minutes.

3 Claims, 2 Drawing Figures

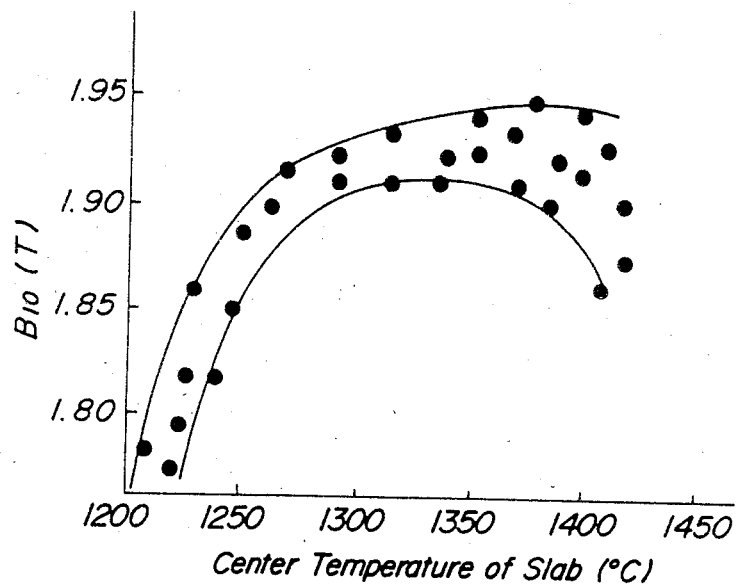
FIG_1
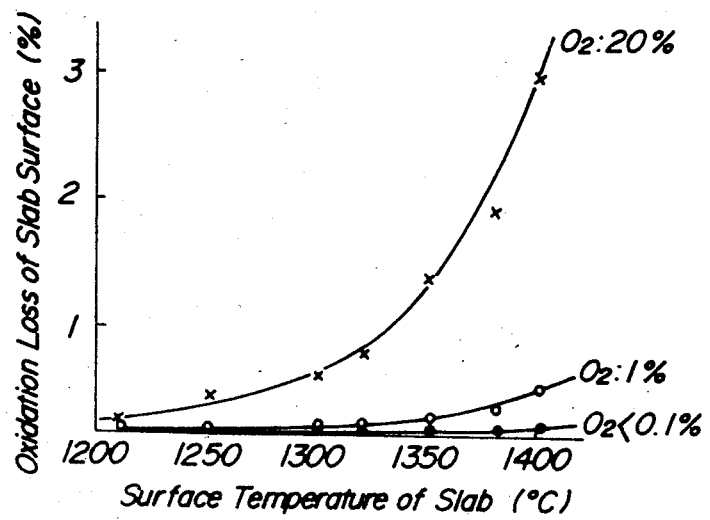
FIG_2

METHOD OF MANUFACTURING GRAIN-ORIENTED SILICON STEEL SHEETS

BACKGROUND OF THE INVENTION

1. Field of the Invention

This invention relates to a method of manufacturing a grain-oriented silicon steel sheet having excellent magnetic properties in the rolling direction. More particularly, it relates to a method of heating a silon steel slab as a material for the silicon steel sheet which advantageously solves troubles attendant upon a necessary high-temperature heating.

2. Description of the Prior Art

As is well known, the grain-oriented silicon steel sheet is composed of secondary recrystallization grains wherein the (110) plane is oriented in the sheet surface and the [001] axis is oriented in the rolling direction. Therefore, it is important to selectively grow crystal grains of such an orientation during the final high temperature box annealing. For this purpose, it is necessary that so-called inhibitors such as MnS, MnSe, AlN and the like disperse uniformly and suppress the growth of crystal grains other than the secondary crystal grains so as to selectively grow the secondary recrystallization grain of (110)[001] orientation prior to the finish annealing.

It has already been well-known that the above dispersion form is controlled by once dissolving the precipitated inhibitors to a solid solution during the heating of the slab prior to the hot rolling and then subjecting the slab to a hot rolling according to a proper cooling pattern.

For this purpose, the heating of the slab is usually performed at an elevated temperature above 1,300° C. Particularly, it is common to heat the outer surface of the slab at a temperature of not less than 1,350° C. in order to sufficiently conduct the heating to the central portion of the slab. In this case, a greater amount of molten scale produced not only impairs the operability of the heating furnace but also raises many troubles such as surface defects due to oxidation of grain boundary, occurrence of edge cracks and the like.

In order to solve the above drawbacks, there have been proposed various methods wherein the heating is carried out at a low temperature by varying the amount of ingredients contained in the steel. For instance, Japanese Patent laid open No. 58-100,627 discloses that the amount of inhibitor and the C content in the steel material are decreased to lower the slab reheating temperature, and Japanese Patent Laid open No. 50-160,120 discloses that the dissolution product of Mn content $\times$ S content in the steel material is decreased to lower the solid solution limit of MnS for performing the low-temperature heating.

However, all of these methods can not act as a complete solution and have not yet been adopted in an industrial scale because the reduction of the inhibitor amount does not stabilize the magnetic properties. Also, the decrease of Mn content frequently produces the edge cracking and surface defect even after carrying out the low-temperature heating of the slab.

On the other hand, the inventors have found that when the conventional slab heating furnace of gas-firing type is used together with a slab induction heating furnace to reduce the temperature difference between the slab surface temperature and the slab center temperature in a high-temperature range, various troubles usually produced by heating the slab surface at an excessively high temperature can advantageously be solved and also the energy-saving and quality can be improved remarkably.

As the method of applying the induction heating to the slab, there are some reports as disclosed, for example, in Japanese Patent Application Publication No. 44-15,047, No. 52-47,179 and the like. The former report is concerned with the control of optimum energy in the multiple heating with a gas annealing furnace, while the latter report discloses a method of preventing the temperature drop at the slab end in the induction heating.

In addition, there are known some proposals relating to the slab induction heating furnace. Among them, however, only the proposal disclosed in Japanes Patent Application Publication No. 47-14,627 is applied to the heating of the slab for the grain-oriented silicon steel, wherein the slab for the grain-oriented silicon steel is heated at 1,250°14 1,300° C. in a gravity charging furnace (or a heating furnace of pusher type) and subsequently heated at a higher temperature of 1,350°–1,400° C. by an electrical means such as induction heating or resistance heating to improve the magnetic properties. In this case, the induction heating of the slab at the high temperature of 1,350°–1,400° C. without controlling the atmosphere is effective for the improvement of magnetic properties, but produces a fairly large amount of slag on the surface of the slab even for a short heating time, resulting in not only the impairing of the furnace operation but also the occurrence of surface defects. Further, when the slab containing no carbon of more than a given amount is heated till the above heating temperature reaches to the center of the slab, crystal grains in the slab become coarse to leave coarse extended grains in the hot rolled sheet, which then turns into fine grain streaks in the finished product to cause the local degradation of magnetic properties.

SUMMARY OF THE INVENTION

It is, therefore, an object of the invention to provide a method of more advantageously induction-heating a slab for silicon steel containing at least one inhibitor of MnS, MnSe and AlN without producing the aforementioned troubles.

According to the invention, grain-oriented silicon steel sheets having excellent magnetic properties, appearance and quality can successfully be obtained in such a manner that a total amount of S, Se and Al in a slab for the silicon steel sheet is limited to 0.005–0.06% (by weight) and an amount of Mn is limited to 0.02–0.10%, and the slab is heated in a slab heating furnace of the conventional gas-firing type till the center temperature of the slab reaches to 900°–1,230° C., preferably 1,000°–1,230° C. and then placed in a slab induction heating furnace to hold the slab center temperature at 1,250°–1,380° C., preferably 1,250°–1,350° C. for not less than 10 minutes, during which the amount of oxygen gas in the atmosphere when the surface temperature of the slab is not less than 1,250° C. is controlled or limited to not more than 1%.

BRIEF DESCRIPTION OF THE DRAWINGS

FIG. 1 is a graph showing a relation between the center temperature (°C.) of the slab in a soaking pit and the magnetic flux density $B_{10}(T)$ of the finished product when the slab is heated in the induction heating furnace; and FIG. 2 is a graph showing an influence of the surface temperature (°C.) of the slab and the $O_2$ content (%) in the furnace atmosphere on the oxidation loss (%) before and after the heating of the slab in the induction heating furnace.

DETAILED DESCRIPTION OF THE INVENTION

A steel material applicable to the invention is a slab for grain-oriented silicon steel containing 2.0–4.5% of Si, which is obtained by a continuous casting or a blooming of a steel ingot, and further contains as an inhibitor 0.005–0.06% in total of at least one element selected from S, Se and Al and 0.02–0.10% of Mn.

The reason for the limitation of these elements is as follows.

Silicon is added for enhancing the specific resistance of the steel sheet and reducing the watt loss thereof. When the amount of Si is less than 2.0%, the crystal orientation is damaged at the finish high-temperature annealing due to $\alpha$-$\gamma$ transformation. While, the upper limit of 4.5% is determined from a viewpoint of cold rollability.

The lower limit of 0.005% on the total amount of S, Se and Al is a minimum amount required for developing these elements as a finely dispersed inhibitor in steel in the forms of MnS, MnSe and AlN. The reason why the upper limit is 0.060% is based on th fact that when the total amount of these elements exceeds 0.060%, the heating at a temperature higher than that controlled in the invention is required for dissolving the above precipitates during the heating of the slab so as to utilize them as an inhibitor, which does not attain the object of the invention aiming at the lowering of the heating temperature as far as possible.

As to the amount of Mn, the lower limit of 0.02% is required for holding the amount as the inhibitor likewise the above case, while the upper limit of 0.1% is required so as not to raise the heating temperature of the slab for solid solubilization of MnS and MnSe.

Moreover, it is known that an intergranular segregation type element such as Sn, As, Pb, Bi, Cu or the like and an element forming a nitride such as BN, VN or the like are further contained in the slab as an inhibitor. In this connection, the invention does not impair the improving effect of the quality by the addition of these elements, so that the above elements may be used within the spirit and scope of the invention.

According to the invention, it is an important feature that the slab containing the above mentioned elements is first heated in a slab heating furnace of the conventional gas firing type till the center temperature of the slab reaches to 900°–1,230° C., taken out from this furnace and then placed in a slab induction heating furnace before the slab center temperature is less than 900° C., at where the slab is heated so as to hold the slab center temperature of 1,250°–1,380° C. for not less than 10 minutes. The term "slab center temperature" used herein means a temperature of that central portion of the slab which exhibits the smallest temperature rising in the heating and does not necessarily mean a temperature of the center of the slab thickness. In general, it is difficult to raise the temperature, at the central portion of the slab, so that the controlling of the temperature at the coldest point of the slab within above defined range is important to stabilize the magnetic properties of the finished product. Moreover, the measurement of the slab center temperature is carried out by piercing a hole of 8 mm in diameter from the surface of the slab and inserting a top of a platinum or platinum-rhodium thermocouple coated with an insulator into the central portion of the slab in the thickness direction.

The reason why the slab center temperature in the gas firing type slab heating furnace corresponding to the preliminary heating of the slab is limited to 900°–1,230° C. is based on the fact that when the slab center temperature is less than 900° C., it takes a long time to raise the temperature to the predetermined value at the subsequent induction heating furnace and the energy cost becomes higher, while when it exceeds 1,230° C., a large amount of slag is produced because this temperature exceeds the melting point of fayalite as a surface layer oxide.

Further, the slab center temperature in the charging into the induction heating furnace is restricted to not less than 900° C. in view of the energy cost. Moreover, the reason why the slab center temperature in the heating by the induction heating furnace is limited to 1,250°–1,380° C. is as follows.

As previously mentioned, the high temperature heating of the slab is necessary to the solid solubilization of the inhibitor. From this point, the lower limit is determined as a solid solution condition for functioning the necessary amount of MnS, MnSe and AlN as an inhibitor in accordance with the amounts of MnS, MnSe and AlN contained in the steel. On the other hand, when the slab heating temperature is too high, the occurrence of fine grain streaks in the finished product due to the coarsening of crystal grains in the slab degrades the magnetic properties of the product and further the energy cost increases, so that the upper limit is required.

FIG. 1 shows an appropriate heating temperature at the central portion of the slab in the induction heating furnace, wherein the magnetic flux density of the finished product is shown in relation to the slab center temperature during the soaking in the slab induction heating furnace. In this case, the finished product is obtained by heating a 3.5% silicon steel slab containing 0.022% of Se, 0.08% of Mn and 0.025% of Sb as an inhibitor through a combination of the gas firing type slab heating furnace and the slab induction heating furnace according to the invention, hot rolling it into a hot coil having a thickness of 2.5 mm and then cold rolling according to the conventional two-step process to obtain a steel sheet having a thickness of 0.30 mm. Particularly, the slab is held at the soaking temperature for 10–15 minutes.

It is understood from FIG. 1 that the magnetic flux density of $B_{10} \leq 1.89T$ is stably obtained when the heating temperature in the central portion of the slab is within a range of 1,250°–1,380° C.

Moreover, when the silicon steel slab having the aforementioned chemical composition is heated at a temperature above 1,350° C., the occurrence of slag may be caused. In order to ensure the heating temperature of up to 1,380° C., it is desirable that the silicon steel slab further contains 0.030–0.080% of C and 0.010–0.20% in total of at least one element selected from Sb, Ni and Mo.

The addition of C is to make uniform the crystal structure by utilizing $\alpha$-$\gamma$ transformation during the hot rolling. For this purpose, it is necessary to add C in an amount of at least 0.030%, which becomes possible to improve the hot rolled crystal structure even if the coarsening of crystal grains is caused by raising the slab center temperature up to 1,380° C. On the other hand, the upper limit of 0.080% is mainly controlled as a possible limit of decarburization at subsequent steps.

Sb, Ni and Mo are elements effective for the prevention of oxidation. In this point, it is necessary to add these elements in a total amount of at least 0.010% for preventing the oxidation of the slab surface during the slab heating or after the taking out from the heating furnace. On the other hand, the upper limit of 0.2% is mainly controlled from the viewpoint of cost.

FIG. 2 shows the change of oxidation loss by the oxygen content in the atmosphere for induction heating and the surface temperature in the slab heating. The oxidation loss is measured by heating the silicon steel slab having the same composition as mentioned above in the gas firing type slab heating furnace till the slab center temperature reaches to 1,150° C. according to the invention, and then heating it in the slab induction heating furnace for 20–40 minutes until the surface temperature of the slab reaches to the value shown in FIG. 2 and further holding such a surface temperature for 10 minutes.

It is understood from FIG. 2 that the oxidation loss can condiserably be reduced when the $O_2$ content in the heating atmosphere is restricted to not more than 1% at the slab surface temperature of not less than 1,250° C.

Particularly, the steps followed by hot rolling to the slab heated under the conditions according to the invention are the same as in the usual manner for the manufacture of grain-oriented silicon steel sheets. Thus, the grain-oriented silicon steel sheet having a thickness of 0.15–0.50 mm can be manufactured by performing one- or two-step cold rolling inclusive of intermediate annealing in accordance with the amount and kind of the inhibitor, decarburization annealing and high-temperature box annealing in this order.

EXAMPLE 1

A silicon steel slab containing 3.24% of Si, 0.075% of Mn and 0.025% of S and having a thickness of 220 mm and a weight of about 8 tons, which was produced by a continuous casting, was subjected to such a heating treatment prior to the hot rolling that after a thermocouple was inserted into the central portion of the slab in the thickness direction, the slab was first heated in a gas firing type slab heating furnace for 2 hours till the slab center temperature reached to 1,200° C. and then immediately heated in a slab induction heating furnace till the slab center temperature reached to 1,310° C. in about 20 minutes and the latter temperature was held for 15 minutes. Thereafter, the thus heated slab was subjected to the hot rolling to form a hot rolled steel sheet having a thickness of 2.5 mm.

Next, the hot rolled steel sheet was pickled to remove an oxide layer from the surface of the sheet, cold rolled to an intermediate thickness of 0.65 mm, subjected to an intermediate annealing in a mixed gas atmosphere of hydrogen and nitrogen at 900° C. for 3 minutes, and cold rolled to a finished thickness of 0.30 mm.

Thereafter, the cold rolled sheet was subjected to a decarburization annealing in a wet hydrogen atmosphere at 800° C. for 3 minutes, coated with MgO as an annealing separator, and subjected to a box annealing in a hydrogen atmosphere at 1,200° C. for 10 hours.

The thus obtained coil product had magnetic properties of W 17/50; 1.12±0.01 W/kg and $B_{10}$; 1.88±0.005T as measured at five positions in the longitudinal direction of the coil, which has a little scattering in the magnetic properties as a general grain-oriented silicon steel.

EXAMPLE 2

A continuously cast silicon steel slab containing 2.95% of Si, 0.081% of Mn, 0.020% of S, 0.022% of Al and 0.0075% of N and having a thickness of 220 mm was heated in the gas firing type slab heating furnace for about 2 hours till the slab center temperature reached to 1,150° C. after the thermocouple was inserted into the central portion of the slab in the thickness direction, taken out therefrom and then placed in the slab induction heating furnace at an interval of 3 minutes. In this case, the slab center temperature was 1,145° C.

Then, the slab was heated in the slab induction heating furnace in $N_2$ gas atmosphere till the slab center temperature reached to 1,330° C. and held at the same temperature for 10 minutes. Thereafter, the slab was hot rolled to a thickness of 2.3 mm.

The thus hot rolled steel sheet was subjected to a normalizing treatment at 1,100° C. for 3 minutes, cold rolled at one-step to a finished thickness of 0.30 mm, subjected to a decarburization annealing at 800° C. for 3 minutes, coated with MgO, and then subjected to a box annealing in hydrogen atmosphere at 1,200° C. for 10 hours. The thus obtained grain-oriented silicon steel sheet coil was a silicon steel having a high magnetic flux density of W 17/50; 1.03±0.02 W/kg and $B_{10}$; 1.93±0.08T as measured at five positions in the longitudinal direction of the coil.

According to the invention, grain-oriented silicon steel sheets with a high quality can be manufactured with advantageously suppressing the damage of the heating furnace due to the high temperature heating of the silicon steel slab.

EXAMPLE 3

A continuously cast silicon steel slab containing 3.28% of Si, 0.048% of C, 0.075% of Mn, 0.025% of Se, 0.035% of Sb and 0.05% of Ni and having a thickness of 220 mm was heated in the gas firing type slab heating furnace for about 1.5 hours till the slab center temperature reached to 1,000° C. after the thermocouple was inserted into the central portion of the slab in the thickness direction, taken out therefrom and then placed in the slab induction heating furnace at an interval of 3 minutes. In this case, the slab center temperature was 994° C.

Then, the slab was heated in the slab induction heating furnace in $N_2$ gas atmosphere till the slab center temperature reached to 1,360° C. and held at the same temperature for 15 minutes. Thereafter, the slab was hot rolled to a thickness of 2.0 mm.

The thus hot rolled steel sheet was subjected to a normalizing treatment at 1,000° C. for 1 minute, cold rolled to a thickness of 0.60 mm, subjected to an intermediate annealing at 1,000° C. for 1 minute, and again cold rolled to a finished thickness of 0.23 mm. The thus cold rolled sheet was subjected to a decarburization annealing in a wet hydrogen atmosphere at 800° C. for 3 minutes, coated with MgO and then subjected to a box annealing in hydrogen atmosphere at 1,200° C. for 10 hours. The thus obtained grain-oriented silicon steel sheet coil was a silicon steel having a high magnetic flux density of W17/50; 0.84±0.02 W/kg and $B_{10}$; 1.92±0.004T as measured at five positions in the longitudinal direction of the coil.

What is claimed is:

1. In a method of manufacturing grain-oriented silicon steel sheets having an orientation of (110), which method includes heating a silicon steel slab containing 2.0 to 4.5% by weight of silicon, 0.02 to 0.10% by weight of manganese and 0.005 to 0.06% by weight in total of at least one element selected from sulfur, selenium and aluminum, hot rolling said heated slab to a thickness of 1.4–3.5 mm, and then cold rolling said hot rolled slab at one-step or two-step inclusive of an intermediate annealing to a finished thickness of 0.15–0.50 mm and thereafter subjecting said slab to a decarburization annealing and a subsequent high temperature box annealing, the improvement which comprises carrying out the heating of said silicon steel slab in such manner that said slab is heated in a slab heating furnace of a gas firing type until a center temperature of said slab reaches to 900°–1,230° C., placing said slab in a slab induction heating furnace before the center temperature of said slab is less than 900° C. and then heating said slab in an inert gas atmosphere, so as to hold the center temperature of said slab at 1,250°–1,380° C. for not less than 10 minutes, during which an amount of oxygen gas in said atmosphere, when a surface temperature of said slab is not less than 1,250° C., is limited to not more than 1%.

2. The method according to claim 1, wherein said silicon steel slab further contains 0.030 to 0.080% by weight of carbon and 0.01 to 0.2% by weight in total of at least one element selected from antimony, nickel and molybdenum.

3. The method according to claim 1, wherein said slab is heated in the gas firing type slab heating furnace till the slab center temperature reaches to 1,000°–1,230° C., placed in the slab induction heating furnace before the slab center temperature is less than 1,000° C., and then heated so as to hold the slab center temperature at 1,250°–1,350° C. for not less than 10 minutes.

* * * * *